(12) United States Patent
Herbert et al.

(10) Patent No.: US 6,810,909 B2
(45) Date of Patent: Nov. 2, 2004

(54) SOLENOID OPERATED PRESSURE CONTROL VALVE

(75) Inventors: David E. Herbert, Rochester Hills, MI (US); Douglas E. Boddy, Troy, MI (US)

(73) Assignee: Eaton Corporation, Cleveland, OH (US)

( * ) Notice: Subject to any disclaimer, the term of this patent is extended or adjusted under 35 U.S.C. 154(b) by 58 days.

(21) Appl. No.: 10/215,074

(22) Filed: Aug. 8, 2002

(65) Prior Publication Data

US 2004/0025948 A1 Feb. 12, 2004

(51) Int. Cl.[7] ............................................. F15B 13/044
(52) U.S. Cl. .................................. 137/596.17; 251/52
(58) Field of Search ......................... 137/596.17; 251/52

(56) References Cited

U.S. PATENT DOCUMENTS

| | | | |
|---|---|---|---|
| 3,245,651 A | * | 4/1966 | Erickson ........................ 251/52 |
| 3,872,878 A | | 3/1975 | Kozel et al. ................. 137/242 |
| 4,949,752 A | * | 8/1990 | Nogle et al. ............ 137/596.17 |
| 6,000,677 A | | 12/1999 | Cook et al. ............. 251/129.07 |
| 6,382,587 B1 | | 5/2002 | Rabe et al. .................... 251/86 |
| 2002/0117216 A1 | * | 8/2002 | Ambrose et al. ....... 137/596.17 |

FOREIGN PATENT DOCUMENTS

| DE | 196 05 895 | 8/1997 |
|---|---|---|
| WO | WO 90 01651 | 2/1990 |

* cited by examiner

Primary Examiner—Gerald A. Michalsky
(74) Attorney, Agent, or Firm—Roger A. Johnston

(57) ABSTRACT

A solenoid operated three port pressure control valve assembly of the exhaust pressure bleed type. The valve for the inlet pressure supply port includes a pressure responsive diaphragm with the supply port obturator attached. A bleed orifice in the diaphragm provides viscous dampening of the movement of the obturator and minimizes inlet valve flutter. The valve assembly is disclosed in both normally open and normally closed configurations.

14 Claims, 4 Drawing Sheets

SOLENOID OPERATED PRESSURE CONTROL VALVE

BACKGROUND OF THE INVENTION

The present invention relates to solenoid operated valves of the type having a supply or inlet port and a pressure control outlet port and an exhaust port through which fluid is discharged to a sump or pressure source return. Such valves are employed to provide electrical control of a fluid pressure signal by controlling the flow of fluid from the inlet port to a valving chamber communicating with the pressure control port and also controlling the amount of fluid bleed to the exhaust for maintaining the desired pressure at the pressure signal outlet port.

Solenoid valves of the aforesaid type have found widespread usage in controlling the flow of hydraulic fluid in automatic transmissions for motor vehicles. In such transmissions the shifting of the transmission speed ratios is controlled by an electronic controller providing an electrical signal to the solenoid operated valve which provides a fluid pressure signal to a pressure responsive actuator for effecting the transmission speed ratio change.

Known valves employed in automatic transmission shift control have utilized a ball valve member disposed in the valving chamber with the ball moved with respect to a valve seat by an operating rod connected to the solenoid armature for controlling flow from the supply port to the valving chamber. However, valves of this type have encountered instability and flutter of the ball valve member upon exposure to hydraulic transients in the system and vibration encountered by the transmission. Efforts to counteract such instability and valve flutter in solenoid operation transmission shift control valves have utilized stiffer bias springs acting against the ball valve. This results in greater force and increased power requirements for the solenoid. For applications requiring a plurality of shift control valves a prohibitively high power consumption for the valves is the result.

The aforesaid solenoid valves employing a ball valve member have been found particularly susceptible to flutter when the ball valve member is in a position to substantially restrict the flow or near the closed position where the flow velocity is increased over the valve seat. It therefore has long been desired to provide a simple and relatively low cost way or means of reducing or eliminating the flutter in a solenoid operated pressure control valve and particularly valves of the type employing solenoid operating off of low voltage power supply widely employed in motor vehicle applications.

BRIEF SUMMARY OF THE INVENTION

The present invention provides a solenoid operated pressure control valve having a supply inlet port valved by a raised surface on a pressure responsive member such as a diaphragm, which raised surface forms an obturator moveable with respect to a valve seat. The obturator is contacted by an operating member extending through an exhaust port valve seat in the valving chamber and the operating member is operatively moved by the solenoid armature. The pressure responsive member preferably in the form of an elastomeric diaphragm has the obturator preferably formed by a rigid insert in the central region of the diaphragm. A bleed orifice provides limited flow across the pressure responsive member to provide viscous dampening of the movement of the obturator. Viscous dampening of the movement of the pressure responsive member and obturator render the valve substantially insensitive to instability and flutter when the valve supply port is subject to transients the valve body is subjected to vibration or the valve is in the nearly closed condition.

DETAILED DESCRIPTION OF THE INVENTION

Figure 1:
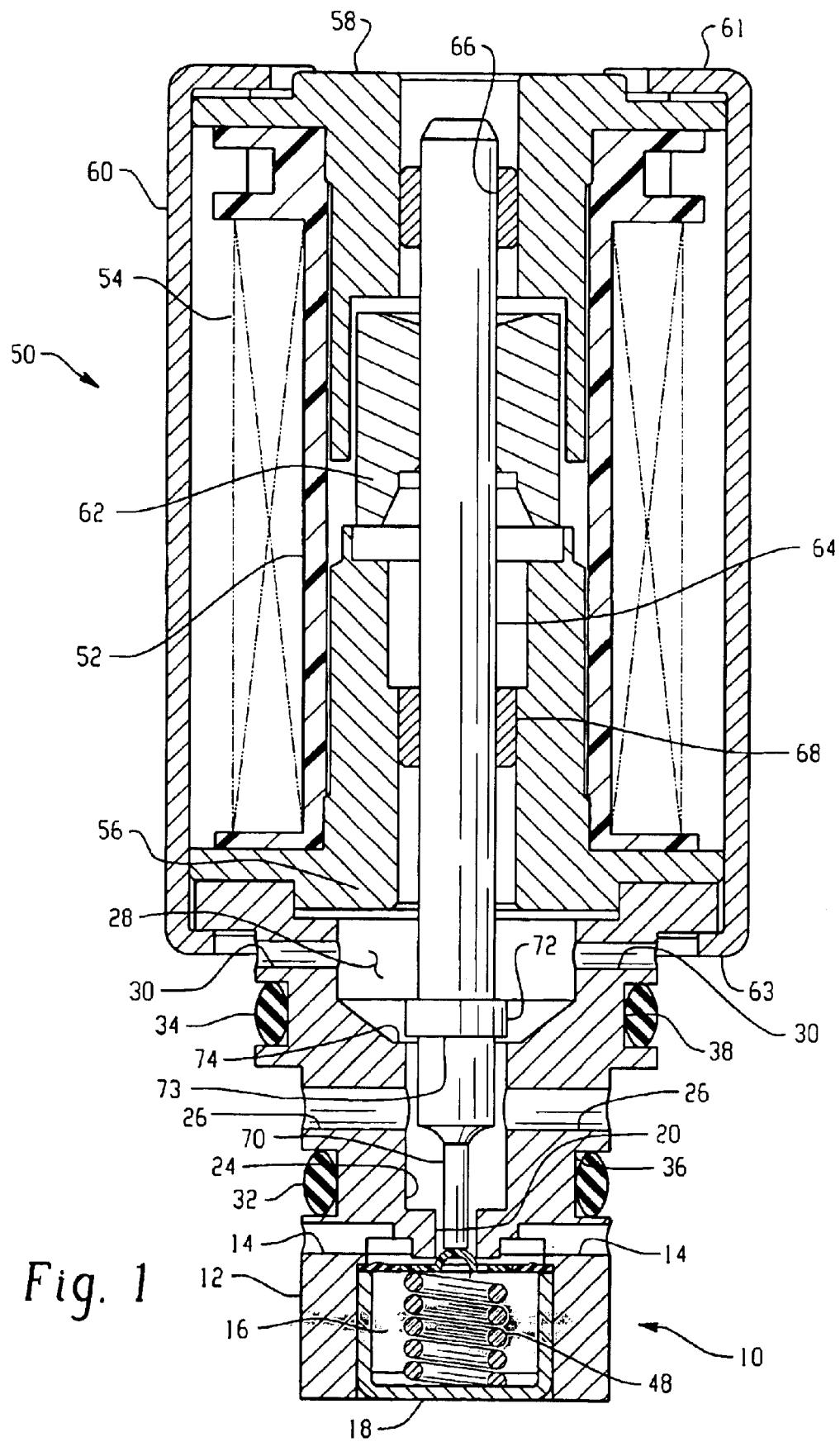
FIG. 1 is a cross-section of the valve assembly of the present invention.
Figure 2:
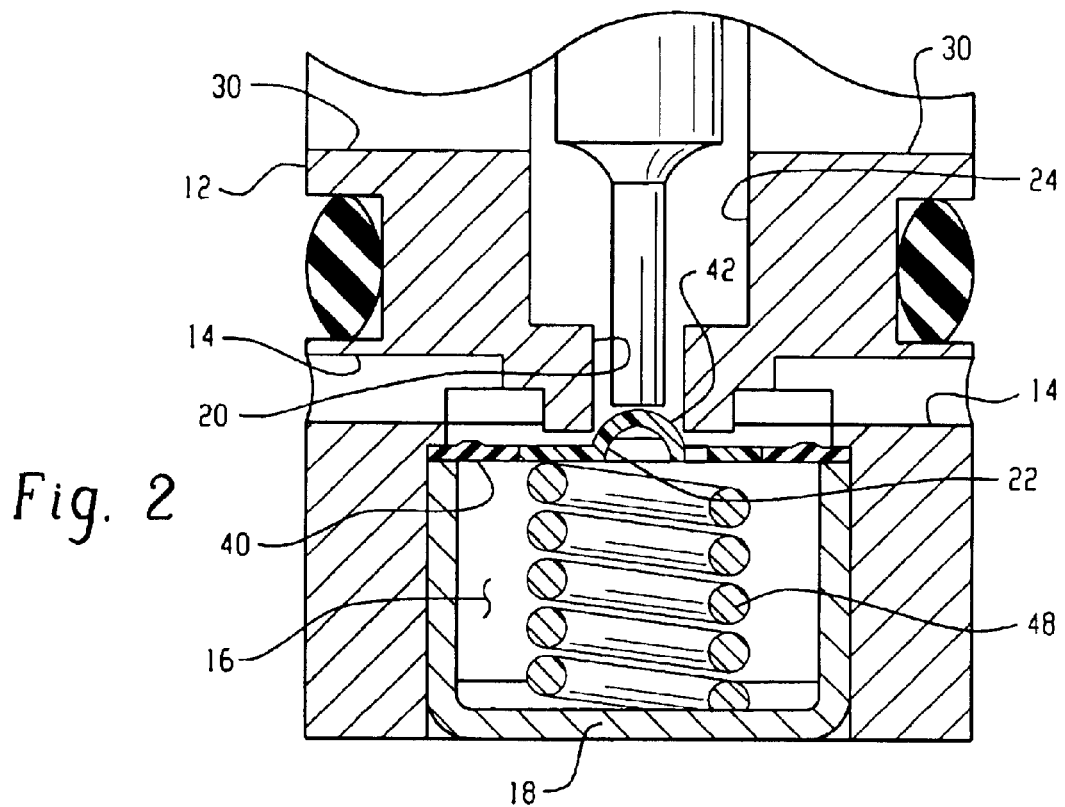
FIG. 2 is an enlarged view of the lower portion of the body of the assembly of FIG. 1.

Referring to FIGS. 1 and 2, the valve assembly of the present invention is indicated generally at 10 and includes a valve body 12 having a supply or inlet preferably comprising a plurality of circumferentially spaced ports 14 which communicate with a valving chamber 16 formed in the lower end of the body and which is closed by a closure member 18 attached to the body by any suitable expedient, as for example, press fit staking or weldment.

The valving chamber 16 communicates with a valving passage 20, the lower end of which defines a valve seat 22 and the upper end of passage 20 communicates with an enlarged diameter bore 24 which has pressure control outlet ports 26 communicating therewith.

The upper end of enlarged bore 24 communicates with an exhaust chamber 28 which has exhaust ports 30 formed therein for discharge to a sump or the source or supply return. The pressure control outlet ports 26 are isolated from the exhaust ports 30 and the inlet supply ports 14 by a pair of resilient seal rings 32, 34 disposed in spaced relationship on opposite sides of the pressure control ports 26 in annular grooves 36, 38 formed in the outer surface of the body 12.

A pressure responsive member preferably in the form of an elastomeric diaphragm 40 is disposed in the valving chamber 16 and sealed and retained therein by closure member 18 contacting the undersurface of the periphery of the diaphragm 40.

Figure 3:
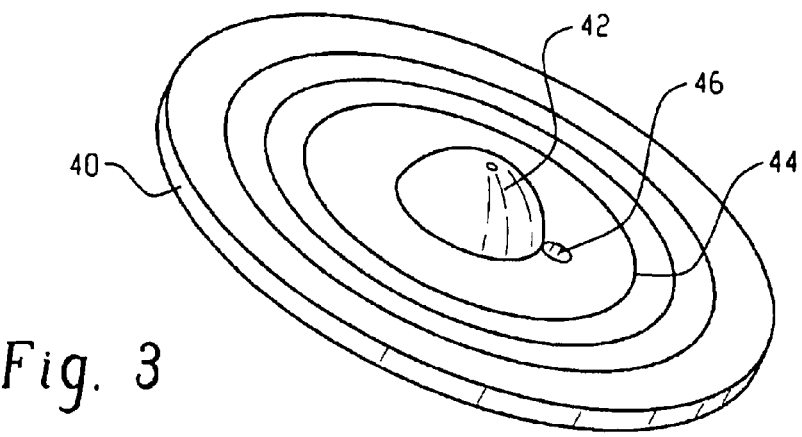
FIG. 3 is an axonometric view of the pressure responsive member of the assembly of FIG. 1.
Figure 4:
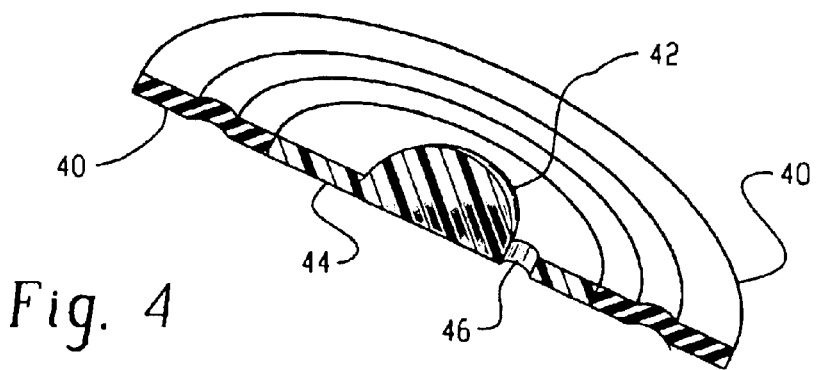
FIG. 4 is a view similar to FIG. 3 with a portion broken away showing the bleed orifice.

Referring to FIGS. 2 through 4, the diaphragm 40 has a raised surface 42 on the upper side thereof and preferably centrally located, which surface 42 forms a moveable obturator for contacting inlet valve seat 22. In the presently preferred practice of the invention, as shown in FIGS. 3 and 4, the obturator 42 is formed on a rigid insert 44 disposed in the central region of the diaphragm 40 and which has a small aperture or bleed orifice 46 formed therein. In the presently preferred practice of the invention, the insert 44 may be formed of plastic or metal as required for withstanding the pressure forces to be encountered in its intended application.

A bias spring 48 is disposed in valving chamber 16 with the lower end thereof registered against the inside surface of closure 18 and the upper end thereof registered against the undersurface of the insert 44 for biasing the obturator 42 in a direction so as to contact and close against inlet valve seat 22 thereby forming a normally closed valve assembly.

Referring to FIG. 1, a solenoid operator indicated generally at 50 has a coil bobbin 52 with coil 54 wound thereon received over a flux ring or collector 56 attached to the upper end of body 12, with the lower end of bobbin 52 received thereover and registered thereagainst. An upper flux collector or ring 58 is partially received within the upper end of bobbin 52; and, the flux rings 56, 58 and bobbin 52 are retained on body 12 as an assembly by an outer casing 60 having radially inwardly extending end flanges 61, 63.

A moveable armature 62 is slidably disposed within the upper flux collector 58 and has the lower end thereof defining a working air gap with the upper end of the lower flux collector 56.

An operating member or rod 64 is received through armature 62 and secured thereto for movement therewith, with the upper end of rod 64 slidably received in a bearing 66; and, the rod 64 extends downwardly through sliding bearing 68 disposed in lower flux collector 56. Rod 64 extends downwardly into exhaust chamber 28 and into enlarged bore 24. The lower end of rod 64 has a reduced diameter pin portion 70 formed thereon which extends downwardly through valving passage 20 with the end thereof disposed for contacting obturator 42.

The portion of operating member or rod 64 extending into the exhaust chamber 28 has formed thereon an annular flange 72 which has the undersurface 73 thereof configured to act as a poppet for seating against an annular exhaust valving surface 74 formed at the upper end of the enlarged bore 24.

In operation, the normally closed valve 10 has the obturator 44 seated against valve seat 22 with the solenoid operator 50 de-energized; and, the pin 70 is in contact with the obturator 42 such that surface 73 of poppet 72 is raised from valve seat 74 permitting the pressure control outlet ports 26 to be open to the exhaust ports 30 and thus no pressure signal provided at ports 26. Upon energization of the solenoid operator 50, the arrangement of flux ring 58 and 56 is such that lower flux ring 56 acts as a pole piece attracting the armature 62; and, armature 62 is moved downwardly by overcoming the bias force of spring 48 tending to close the air gap between the lower surface of armature 62 and the upper end of lower flux ring 56 such that pin 70 progressively moves obturator 42 away from seat 22 and moves poppet 72 closer to valve seat 74 reducing flow to the exhaust and thereby increasing the pressure to the pressure control outlet ports 26. When the undersurface 73 of poppet 72 contacts valving seating surface 74 and closes the exhaust ports 30 from the pressure control ports 26, obturator 42 is held away from seat 22 permitting full supply pressure to be applied to the signal control outlet port 26.

The bleed orifice 46 permits a small amount of flow therethrough from opposite sides of the diaphragm 40 as the diaphragm is moved. This viscous flow enables the diaphragm to absorb transients thereagainst as may enter the supply ports 14 and provides dampening of the movement of the obturator 42.

Figure 5:
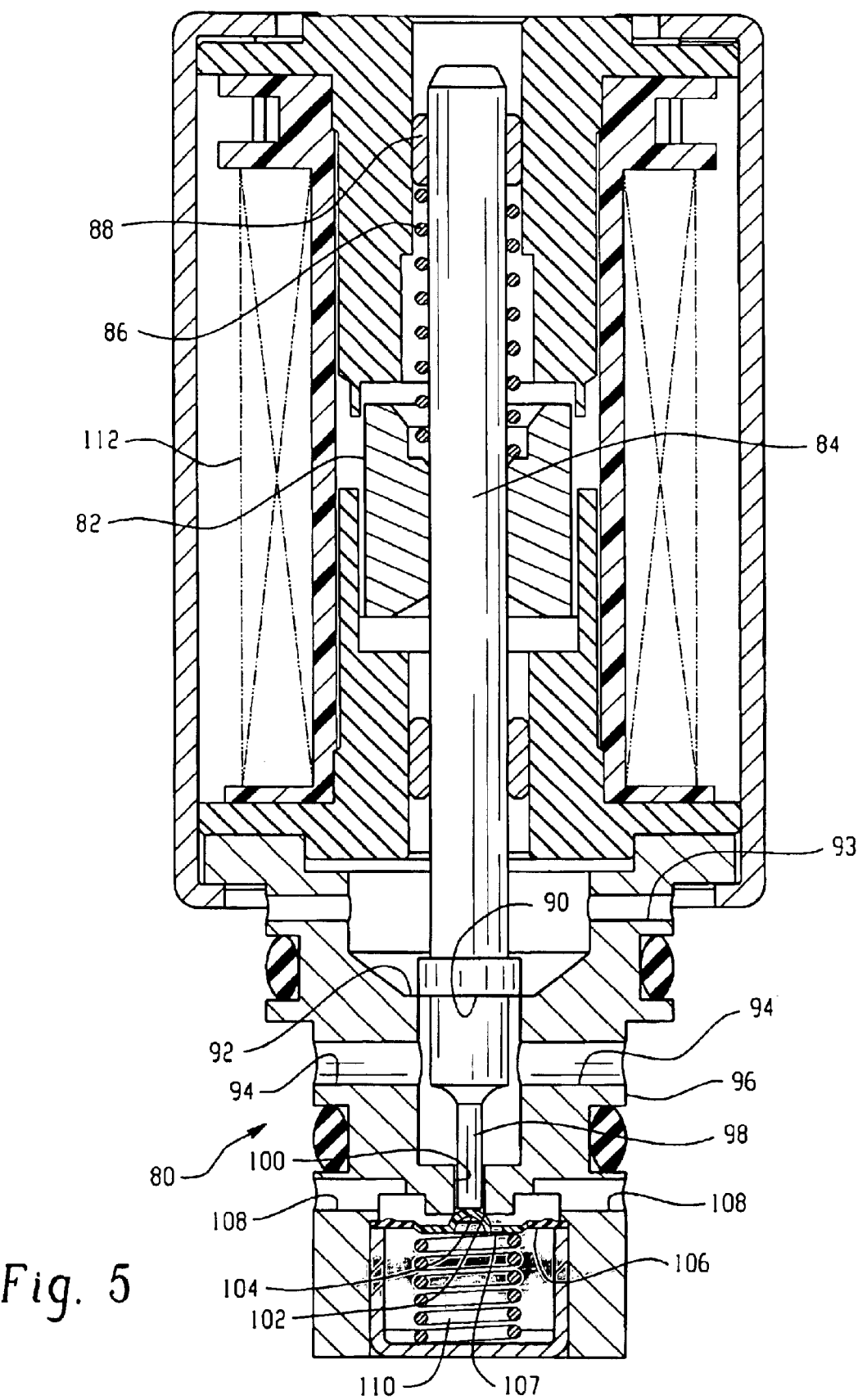
FIG. 5 is a view similar to FIG. 1 of an alternate embodiment of the invention with the inlet valve normally open in the de-energized condition; and, FIG. 6 is a view of the valve of FIG. 5 in the energized closed condition.
Figure 6:
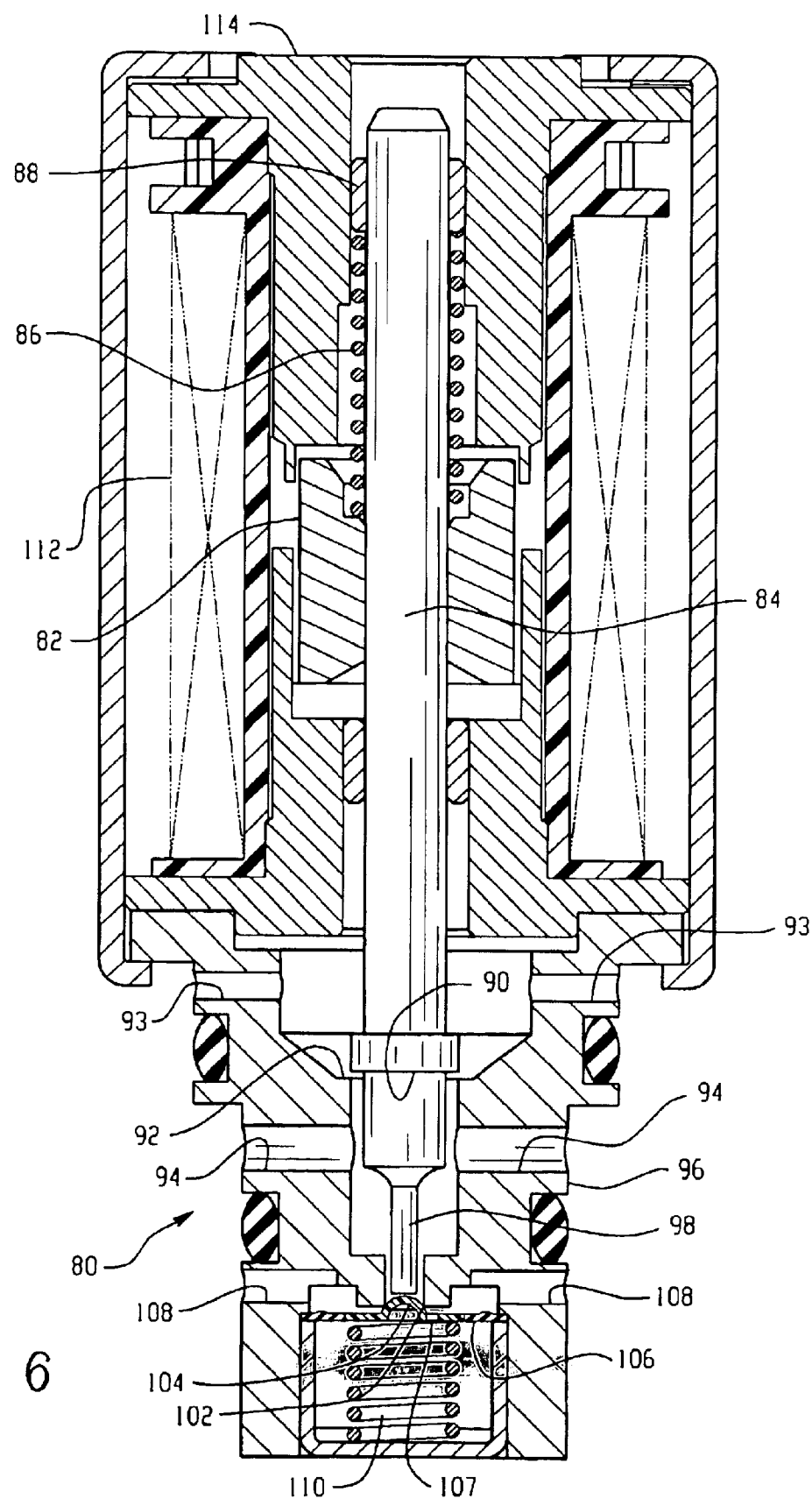

Referring to FIGS. 5 and 6, an alternate embodiment of the valve assembly of the present invention is indicated generally at 80 and is shown in FIG. 5 in the de-energized normally open condition; and, the assembly 80 is shown in FIG. 6 in the energized condition with the inlet closed.

The assembly 80 is similar to the assembly 10 of FIGS. 1 through 4 with the exception that the annular armature 82 with operating rod 84 received therethrough and secured for movement therewith has the upper end of a spring 86 registered against the upper bearing 88 with the lower end of the spring 86 registered against the upper end of armature 82 and biasing the armature and operating rod 84 in a downward direction.

As in the case of the embodiment 10 of FIGS. 1 through 4, the embodiment 80 of FIGS. 5 and 6 has the operating rod 84 provided with an annular valving surface 90 for closing against the exhaust valve seat 92 for controlling flow to the exhaust port 94. The lower end of rod 84 has a pin 98 provided thereon for extending downwardly through passage 100 which has a valve seat 102 formed on the undersurface thereof against which is moved an obturator 104 for closing against valve seat 102. The obturator is attached to a pressure responsive diaphragm 106 which is similar to the diaphragm 40 of FIGS. 3 and 4. The obturator 104 thus controls flow between the supply pressure inlet ports 108 and the passage 100 which communicates with the control pressure signal outlet ports 94.

A relatively light or low rate spring 110 biases the obturator and diaphragm upwardly in a direction to maintain contact with the end of pin 98.

As shown in FIG. 5, with the coil 112 de-energized spring 86 provides sufficient preload to overcome the force of spring 110 and causes the pin 98 to move obturator 104 away from the valve seat 102.

Referring to FIG. 6, the valve is shown with coil 112 energized wherein upper flux ring 114 acts as a pole piece attracting armature 82; and, armature 82 is moved upward overcoming the preload force of spring 86 and raises the valving surface 90 from valve seat 92 and allows flow from the pressure control ports 94 to the exhaust ports 93 and moves obturator 104 toward valve seat 102 to restrict flow from the inlet ports 108 through passage 100. When the coil 112 is fully energized pin 98 is lifted sufficiently to allow obturator 104 to be biased against the valve seat 102 by spring 110 thereby closing flow from inlet 108 through passage 100. With the inlet valve seat 102 closed, pressure in pressure control ports 94 is bled through the exhaust ports 93 until there is no control signal outlet pressure.

It will be understood that a bleed orifice 107 is provided in diaphragm 106, similar to orifice 46 in diaphragm 40 of FIGS. 3 and 4; and, orifice 107 functions to provide viscous dampening of the movement of the obturator thereby minimizing inlet valve flutter.

The present invention thus provides a simple and low cost valve construction employing a pressure responsive diaphragm with a bleed orifice therethrough having the inlet valve obturator moveable therewith and thus the bleed orifice is operative to dampen movement of the obturator.

Although the invention has hereinabove been described with respect to the illustrated embodiments, it will be understood that the invention is capable of modification and variation and is limited only by the following claims.

What is claimed is:

1. A solenoid operated pressure control valve comprising:
  (a) a valve body with a valving cavity with a supply port, a pressure control port and an exhaust port, said cavity having a portion of the wall thereof including a pressure responsive flexible diaphragm member movable with respect to the inlet port, said body including a poppet movable with respect to said exhaust port;
  (b) an operating member moveable with said poppet including a portion received through said exhaust port and operative to effect movement of said pressure responsive member; and, (c) a solenoid associated with said body having an armature and operative upon energization to effect movement of said operating member and poppet for valving said exhaust port and moving said pressure responsive member for valving said inlet port, wherein said pressure responsive member includes a bleed orifice therethrough communicating said supply port with the opposite side of said portion of said wall and permitting limited flow therethrough for dampening movement thereof.

2. The valve described in claim 1, wherein said pressure responsive member includes an obturator thereon.

3. The valve described in claim 1, wherein said flexible diaphragm includes elastomeric material.

4. The valve described in claim 1, wherein said pressure responsive flexible diaphragm member includes a valving surface with a curvature.

5. The valve described in claim 1, wherein said diaphragm is formed of elastomeric material.

6. The valve described in claim 1, wherein said pressure responsive member includes an elastomeric diaphragm having said pressure responsive flexible diaphragm member comprising a rigid member attached thereto with said bleed orifice formed therein.

7. The valve described in claim 1, wherein said pressure responsive member includes means biasing the pressure responsive flexible diaphragm member in a direction to close said inlet port.

8. The valve described in claim 1, wherein said portion of said poppet comprises an annular surface formed on said operating member.

9. A method of dampening a bleed type pressure control valve comprising:

(a) forming a valve body having a valving chamber communicating with a supply pressure inlet, a control pressure outlet and an exhaust outlet;

(b) disposing a poppet for valving movement with respect to said exhaust outlet;

(c) connecting an operating member to the poppet and extending the member through the exhaust port into the valving chamber;

(d) disposing a pressure responsive flexible diaphragm member in said valving chamber inlet and disposing an obturator moveable therewith and valving said supply pressure inlet with said obturator;

(e) disposing a solenoid on said body and connecting the armature thereof for effecting movement of said poppet and operating member upon solenoid energization; and, (f) contacting said obturator with said operating member and moving said obturator in response to said operating member movement; and, (g) forming a bleed orifice in said pressure responsive member and dampening movement of said obturator with flow through the bleed orifice.

10. The method defined in claim 9, wherein said step of disposing a pressure responsive member includes biasing said member to close said supply pressure inlet.

11. The method defined in claim 9, wherein said step of disposing a pressure responsive member includes disposing the diaphragm over said supply inlet.

12. The method defined in claim 9, wherein said step of disposing a pressure responsive member includes disposing an elastomeric diaphragm and said step of disposing an obturator includes forming a raised portion on said diaphragm.

13. The method defined in claim 9, wherein said step of connecting an operating member to the poppet includes forming the poppet integrally on said operating member.

14. The method defined in claim 9, wherein said step of contacting said obturator with said operating member includes extending said operating member through said supply pressure inlet.

* * * * *